Oct. 23, 1973 — G. E. DOLBEAR — 3,767,764
SYSTEM FOR REMOVING NITROGEN OXIDE FROM AUTOMOTIVE EXHAUST
Filed Dec. 9, 1971
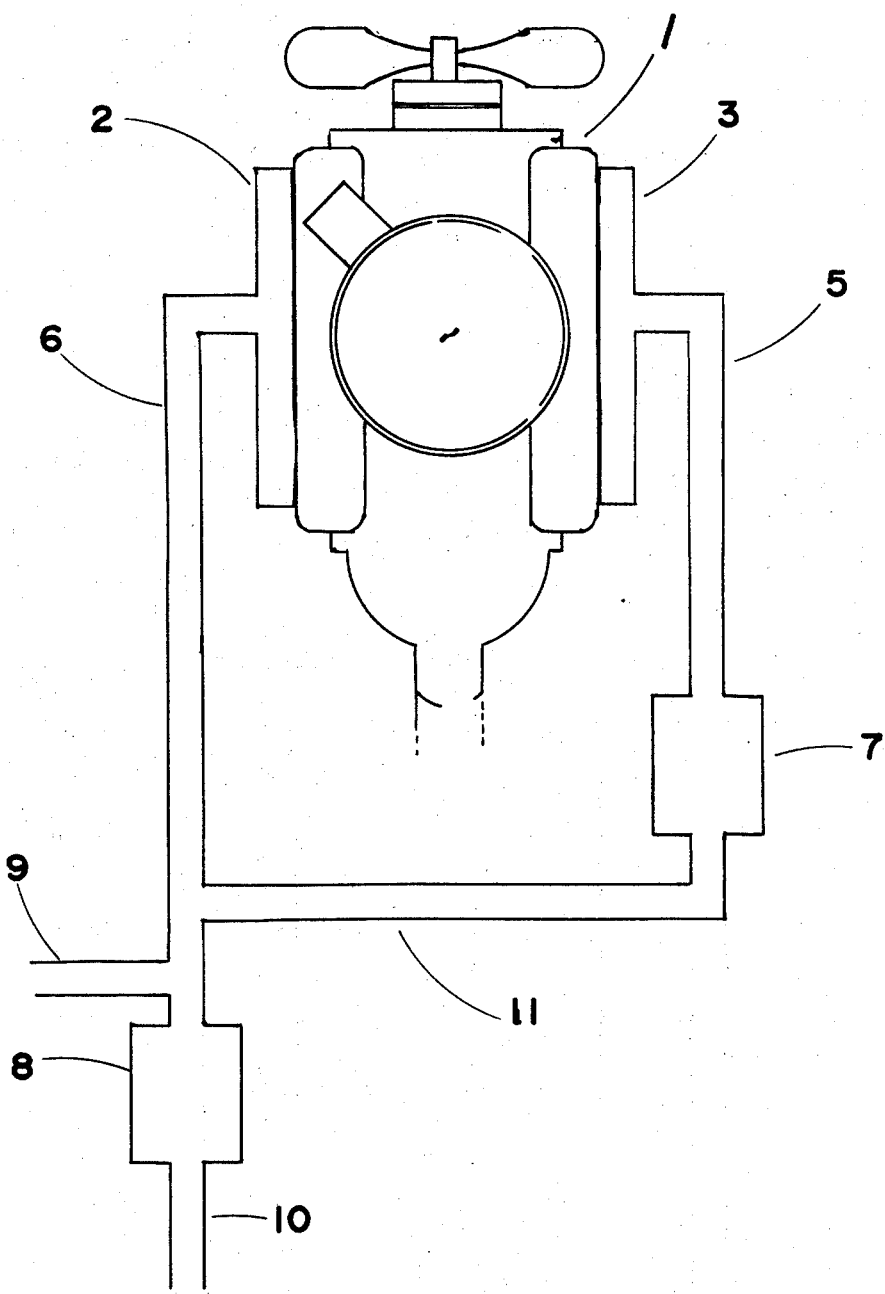
INVENTOR
GEOFFREY E. DOLBEAR
BY
ATTORNEY

3,767,764
SYSTEM FOR REMOVING NITROGEN OXIDE FROM AUTOMOTIVE EXHAUST

Geoffrey E. Dolbear, Columbia, Md., assignor to W. R. Grace & Co., New York, N.Y.
Filed Dec. 9, 1971, Ser. No. 206,376
Int. Cl. B01d 53/00
U.S. Cl. 423—213.2          5 Claims

ABSTRACT OF THE DISCLOSURE

A process for removing carbon monoxide, hydrocarbons and nitrogen oxides from the exhaust stream of internal combustion engines by passing the exhaust gas through a catalyst for conversion of CO to carbon dioxide and nitrogen oxides to ammonia, followed by admixing the effluent from the catalyst with a second exhaust gas stream diluted with air, and passing this combined effluent through a second catalytic convertor, wherein the ammonia and nitrogen oxides react to form nitrogen, and the CO and hydrocarbons are converted to innocuous entities.

BACKGROUND OF THE INVENTION

The problem of air pollution is not a new one; however, the problem has become aggravated in many cities in recent years. The air in most cities contains substantial quantities of both the oxides of nitrogen and the products of incomplete combustion of organic fuels. In the presence of sunlight, photolysis of the oxides and nitrogen lead to the formation of measurable quantities of ozone. The ozone, in turn, reacts with various organic pollutants to form compounds which can cause the many undesirable manifestations of smog, such as eye irritation, visibility reduction, and plant damage.

Almost since the advent of the automobile, attempts have been made to solve the problem by rendering harmless and non-objectionable the noxious fumes which are the by-products of the internal combustion engines. Various devices and filters using elementary catalytic materials and various modifications of mufflers have been designed in an attempt to solve the problem. Several catalytic systems have been devised that give satisfactory results in the conversion of carbon monoxide and hydrocarbons. Thus, U.S. Pat. 3,449,063 to Griffing et al. describes a method of reducing the noxious components of an exhaust gas by mixing the exhaust gas with oxygen and ammonia and contacting the mixture with a copper containing catalyst on a suitable support. U.S. Pat. 3,599,427 covers another system of this type in which ammonia is added to the exhaust gas after it has been passed through a catalyst for the conversion of carbon monoxide and hydrocarbons and after it is cooled, but before it is passed through a nitrogen oxide catalyst.

The addition of ammonia to exhaust gases presents very serious problems. Obviously, it is inconvenient to provide a cylinder containing gaseous ammonia as part of the exhaust purification system. In addition, these cylinders must be removed and refilled with ammonia from time to time.

BRIEF DESCRIPTION OF THE INVENTION

I have found that the hydrocarbons, carbon monoxide and nitrogen oxide in automotive exhaust gas emissions can be converted to innocuous entities without requiring the addition of ammonia to the gas stream in a system that utilizes two catalytic converters; in the first system a portion of the exhaust gas is passed over a catalyst which promotes the reduction of the nitrogen oxides to ammonia. The effluent from this reactor is then mixed with the balance of the effluent from the engine. Air is added and the mixture is passed over a second catalyst which converts the ammonia and nitrogen oxides to nitrogen, the carbon monoxide to carbon dioxide and hydrocarbons to carbon dioxide water.

Although my novel system is particularly applicable to "V8" type automotive engines, satisfactory results are obtained in four and six cylinder engines with slight modifications of the system.

DETAILED DESCRIPTION OF THE INVENTION

My novel system depends on the arrangement of the two catalytic convertors. The system is particularly applicable to the V8-type engines that have exhaust manifolds on either side of the engine. For purposes of simplicity, we will describe the system with reference to this type of engine. However, it is obvious that the system is equally applicable to 4 and 6 cylinder engines with minor modification of the exhaust collection system of these engines.

In my novel system, the exhaust stream from half of the engine cylinders is passed over a catalyst which promotes reduction of all of the nitrogen oxides to ammonia presumably by the following reactions:

(I) $\quad CO + H_2O \rightarrow CO_2 + H_2$ (II) 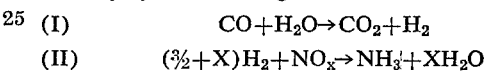

Any of the catalysts that are selective for nitrogen oxide can be utilized as the catalyst in the first catalyst convertor. A particularly desirable catalyst is the catalyst described in co-pending application Ser. No. 164,466 filed July 29, 1971. This catalyst has the following compositions by weight:

|  | Percent |
|---|---|
| Cobalt oxide | 4–12 |
| Palladium oxide | 0.01–0.06 |
| Iron oxide | 2–12 |
| Support-Balance | |

| | |
|---|---|
| Cobalt oxide | 4–12 |
| Palladium oxide | 0.01–0.06 |
| Nickel oxide | 2–12 |
| Support-Balance | |

Another suitable catalyst is a platinum catalyst containing 0.01 to 1% platinum on alumina or other suitable support. The support material includes a wide variety of inexpensive finely divided ceramic materials such as, for example:

(a) metal oxides and hydroxides, especially those of silicon and aluminum, such as gamma alumina;
(b) metal silicates and aluminates such as mullites, naturally occurring clays, mica, etc. precipitated silicates, synthetic zeolites, etc.
(c) titanates, zirconates and compositions generally known to function as catalyst supports.

After the nitrogen oxide has been converted to ammonia, the effluent from this first catalytic convertor is mixed with the balance of the effluent from the engine, air is added to provide a net oxidizing atmosphere, and the admixture is passed into a second catalytic convertor wherein the following reaction takes place.

(I) $\quad 2NH_3 + 3NO \rightarrow 5/2 N_2 + 3H_2O$
(II) $\quad 4NH_3 + 3NO_2 \rightarrow 7/2 N_2 + 6H_2O$
(III) $\quad CO + \frac{1}{2}O_2 \rightarrow CO_2$
(IV) $\quad \text{"HC"} + O_2 \rightarrow CO_2 + H_2O$ The first two reactions give a net removal of nitrogenous pollutants while the third and fourth reactions result in the removal of carbon monoxide and uncombusted hydrocarbons.

Any of the several catalysts well known in the art for converting the noxious components of automobile exhaust to innocuous entities may be used. The catalyst described in U.S. Pat. 3,295,918 to Briggs et al. would give satisfactory results. This catalyst contains 2–12% copper oxide, 0.0025–0.4% palladium, 2–18% manganese oxides and 1–20% chromia on a suitable support.

The same supports that are described as suitable for the catalyst on the first catalytic reactor can be used as supports for the catalyst in the second reactor.

In addition, the catalyst described in U.S. Pat. 3,449,063 to Griffing et al. can also be used. This catalyst is best described as a copper oxide catalyst on an alumina support. The catalyst is prepared by impregnating a support material with cupic nitrate solution. The impregnated support is dried at 100° C. and then calcined 565° C. for a period of about 1½ hours. The final step in the preparation is calcination for 3 hours at 590° C. in a stream of flowing air. The final product contains 5% copper as copper oxide on the support.

My invention is best explained with reference to the drawing in which the engine 1 has exhaust manifolds, 2 and 3 attached to either side in the conventional manner. Each of the exhaust manifolds is connected through the pipe systems 5 and 6 to catalytic converters 7 and 8. A provision for adding air to the system is provided from a pump (not shown) through air inlet 9. The effluent from the converter 8 is passed through the collection tube 10 to the tail pipe (not shown) and is exhausted to the atmosphere.

In operation, the exhaust from the manifold 3 is conducted through the pipe 5 into the converter 7 which contains the catalysts for the conversion of nitrogen oxides to ammonia. The effluent from the reactor 7 is collected in the tube 11 and is admixed with the effluent from exhaust manifold 2 in the pipe 6. Air is introduced through line 9 and the mixture is passed into the converter 8 where it is contacted with an oxidation catalyst for oxidizing the carbon monoxide hydrocarbons and nitrogen oxide to innocuous entities. The effluent from the catalytic converter 8 is passed to the atmosphere.

What is claimed is:

1. A process for converting the hydrocarbons, carbon monoxide and nitrogen oxides in auto exhaust gases to innocuous entities which comprises contacting said gases from half of the engine cylinders with a catalyst specific for reducing nitrogen oxides to ammonia in a first catalytic converter mixing said portion with air to provide a net oxidizing atmosphere and with the balance of the exhaust gases and contacting said mixture with an oxidation catalyst in a second catalytic converter to convert the hydrocarbons, carbon monoxide and nitrogen oxides to innocuous entities.

2. The process according to claim 1 wherein the catalyst specific for reducing nitrogen oxide to ammonia comprises 4–12 weight percent cobalt oxide 0.01 to 0.6 weight percent palladium oxide and 2 to 12 weight percent of an oxide of a transition metal on a suitable support.

3. The process according to claim 1 wherein the oxidation catalyst comprises 0.01 to 25 weight percent copper oxide and 0.01 to 3 weight percent palladium on a suitable support.

4. The process according to claim 1 wherein the oxidation catalyst on the catalyst specific for the reduction of nitrogen oxide to ammonia are supported on a support selected from the group consisting of alumina, zirconia, silica, silica-alumina, aluminum silicates, magnesia and mullite.

5. The process according to claim 1 wherein the catalyst specific for reducing nitrogen oxide and the oxidation catalyst are on an alumina support.

References Cited
UNITED STATES PATENTS

| | | | |
|---|---|---|---|
| 3,708,980 | 7/1971 | Truxell | 60—301 X |
| 3,086,839 | 4/1963 | Bloch | 423—212 |
| 3,449,063 | 6/1969 | Griffing et al. | 423—213 |
| 3,599,427 | 8/1971 | Jones et al. | 423—212 |
| 3,567,367 | 3/1971 | Kandell et al. | 423—239 |

OTHER REFERENCES

Mellor: Comprehensive Treatise on Inorganic and Theoretical Chemistry, Longmans, Green & Co., New York, 1928, vol. VIII, pp. 394–397 and 428–29.

GEORGE O. PETERS, Primary Examiner

U.S. Cl. X.R.

60—274, 301; 423—213.5, 213.7